United States Patent [19]

Anderson

[11] 4,401,179
[45] Aug. 30, 1983

[54] ASSIST ASSEMBLY FOR CAB STRUCTURE

[75] Inventor: Robert M. Anderson, Burlington, Iowa

[73] Assignee: J. I. Case Company, Racine, Wis.

[21] Appl. No.: 299,376

[22] Filed: Sep. 4, 1981

[51] Int. Cl.³ .............................................. B62D 27/00
[52] U.S. Cl. .............................. 180/89.14; 180/89.15; 74/105
[58] Field of Search ............... 180/89.14, 89.15, 89.16, 180/89.18, 89.19; 74/105, 102, 96

[56] References Cited

U.S. PATENT DOCUMENTS 3,944,017  3/1976  Foster .............................. 180/89.15
4,304,142 12/1981  Blomstrom ....................... 180/89.15

FOREIGN PATENT DOCUMENTS 1273861  5/1972  United Kingdom ............. 180/89.15

Primary Examiner—Robert R. Song
Attorney, Agent, or Firm—Cullen, Sloman, Cantor, Grauer, Scott & Rutherford

[57] ABSTRACT

An assist assembly for reducing the work required by an operator in rotating a cab structure on a machine between selected positions. The basic components of the assist assembly include a bellcrank member, a cab movement transmission linkage, and an extensible and retractable actuator. The actuator applies a constant pushing force on the bellcrank member urging it to rotate in a first direction. This pushing force is converted by the bellcrank member into a pulling force on the cab movement transmission linkage which assists the operator in rotating the cab structure until the center of gravity of the cab structure moves to a point directly above its rotational axis on the machine. When the center of gravity for the cab structure moves past direct vertical alignment with its rotational axis, the pulling force on the transmission linkage is opposed and counteracted by an even greater opposite force from the cab structure which urges the bellcrank member to rotate in an opposite direction causing the actuator to retract under pressure. Thus, the bellcrank member reverses the direction of stroke of the actuator when the center of gravity for the cab structure moves in either direction beyond direct vertical alignment with its rotational axis. This assists the operator in rotating the weight of the cab structure up to the point of vertical alignment and then dampens or retards the movement of the cab structure until it reaches a stop position.

2 Claims, 12 Drawing Figures

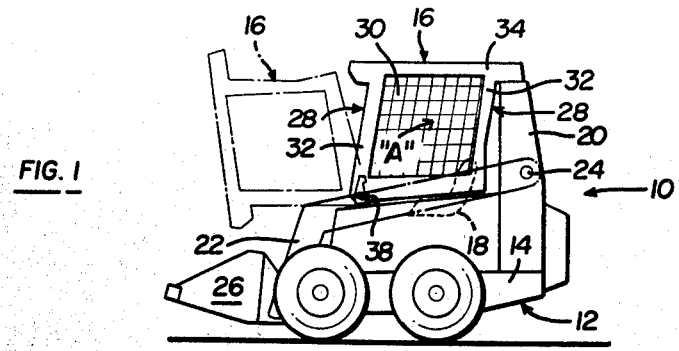
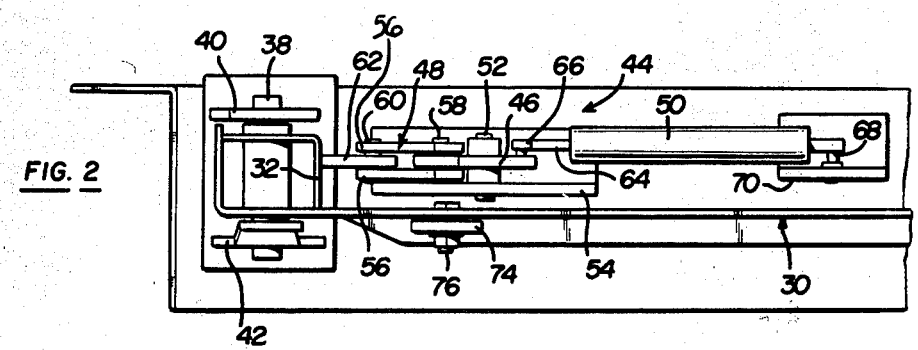
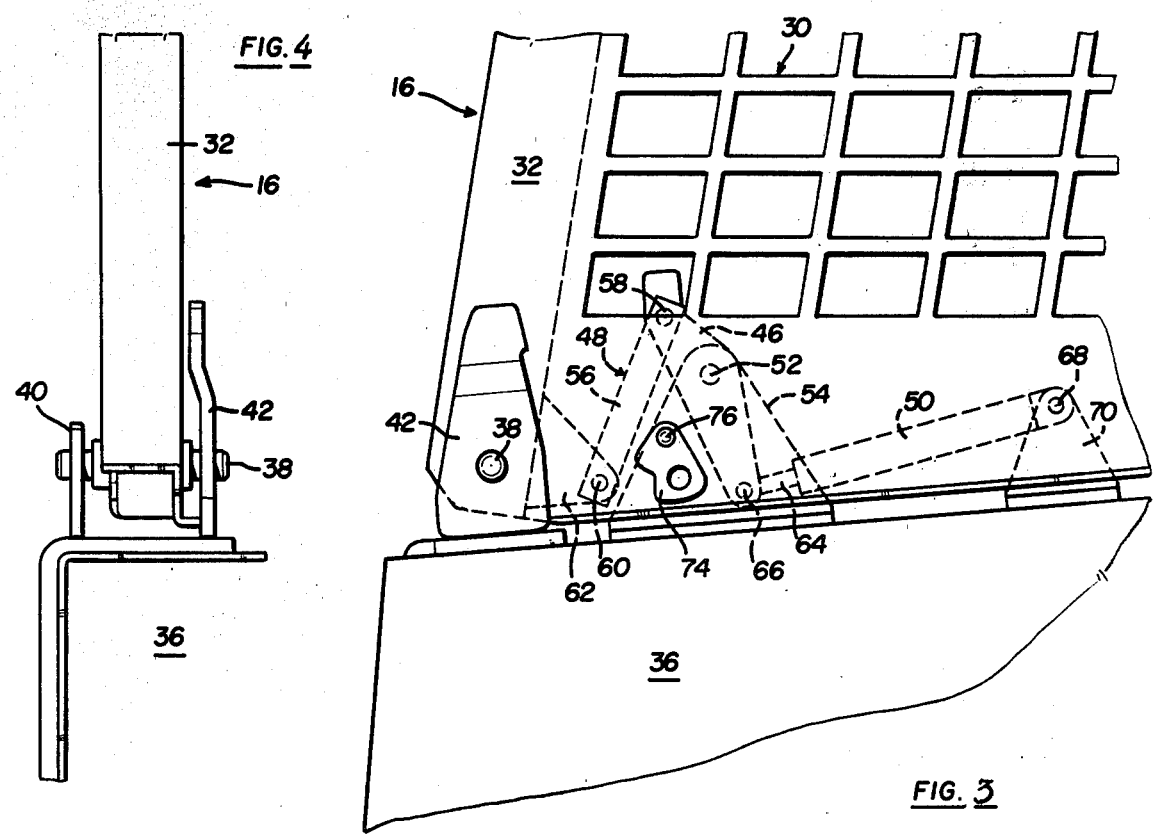

ASSIST ASSEMBLY FOR CAB STRUCTURE

BACKGROUND OF THE INVENTION

The present invention relates to an assist assembly for reducing the effort required by an operator in rotating a cab structure on a machine between selected positions.

The invention may be used in connection with a front end loader of the type having a material handling bucket supported for pivotal movement about a transverse axis on the forward end of a boom structure. The conventional front end loader disclosed herein includes an elongated body having an engine compartment adjacent the rear end thereof and an operator's compartment mounted on the body. In machines of this type, usually some form of cab structure is provided for enclosing the operator's compartment. A problem arises because the cab structure prevents free access into the internal working parts of the machine for maintenance and repair work.

To overcome this problem, the cab structure may be rotatably attached to the loader frame for permitting rotational movement of the cab structure about a horizontal axis that is transverse to the longitudinal axis of the machine. The cab structure may then be rotated to an out-of-the-way position which will allow the operator access into the machine for maintenance or repair work. However, because of the size and weight of the cab structure, there is a need for a mechanism that will mechanically assist the operator in moving the cab structure to an out-of-the-way position and further assist the operator when he moves the cab structure back to its normally closed position.

During the rotational movement of the cab structure, its center of gravity passes through a point directly above its transverse rotational axis. Thus, it is desired that the assist mechanism help the operator in rotating the weight of the cab structure up to that point and then dampen or retard the movement of the cab structure until it reaches a stop position. Further, the mechanism should provide assistance to the operator when the cab structure is being rotated in either direction.

Thus, it is an object of the present invention to provide an assist assembly for reducing the work required by an operator in moving a rotatable cab structure between its extreme stop positions. The assist assembly of the present invention helps the operator in rotating the cab structure until its center of gravity moves to a point directly above the rotational axis for the cab structure and then dampens the movement of the cab structure until it reaches a stop position. The mechanical advantage provided by the assist assembly is the same when the cab structure is rotated in either direction.

SUMMARY OF THE INVENTION

The present invention is disclosed in connection with a machine, such as a front end loader, including an elongated body having an engine compartment adjacent the rear end thereof and an operator's compartment mounted on the body. A cab structure having the shape of an inverted open box encloses the operator's compartment. The cab structure is rotatably movable about a transverse horizontal axis between a closed position and a forward position where the internal working parts of the machine are exposed for maintenance of repair work.

In the closed or first stop position of the cab structure, the longitudinal axis of the cab structure is substantially parallel to the longitudinal axis of the loader with the center of gravity of the cab structure being located rearwardly of its rotational axis. The cab structure is rotated about its transverse rotational axis to a forward or second stop position where the longitudinal axis of the cab structure is substantially perpendicular to the longitudinal axis of the loader. During its rotational movement, the center of gravity of the cab structure passes through a point directly above its rotational axis.

The assist assembly of the present invention reduces the effort required by an operator in moving the cab structure between its first and second stop positions. The basic components of the assist assembly include a bellcrank member, a cab movement transmission linkage, and an extensible and retractable actuator. The bellcrank member is rotatably mounted substantially at its mid portion to a vertical support lug that is secured to a frame portion of the loader. The cab movement transmission linkage includes a pair of opposed parallel links which are pivotally connected at one end to the bellcrank member. The other end of the links is pivotally connected to a bracket which is secured to the cab structure. The actuator is pivotally attached to the bellcrank member at one end and has its opposite end pivotally attached to a vertical support lug on the loader frame portion.

The actuator applies a constant pushing force on the bellcrank member that urges the bellcrank member to rotate in a first direction. The pushing force from the actuator is converted by the bellcrank member into a pulling force on the transmission linkage which assists the operator in rotating the cab structure until the center of gravity of the cab structure moves to a point directly above its rotational axis. When the center of gravity for the cab structure moves past direct vertical alignment with its rotational axis, the pulling force on the transmission linkage from the actuator is opposed and counteracted by an even greater opposite pulling force from the cab structure which urges the bellcrank member to rotate in an opposite direction causing the actuator to retract under pressure.

Thus, the bellcrank member reverses the direction of stroke of the actuator when the center of gravity for the cab structure moves in either direction beyond the point of direct vertical alignment with its rotational axis. This assists the operator in rotating the weight of the cab structure up to the point of vertical alignment and then dampens or retards the movement of the cab structure until it reaches a stop position. The operation of the assist assembly is the same during rotational movement by the cab structure in either direction.

A releasable latching mechanism is provided for holding the cab structure in its full forward stop position. This prevents the cab structure from being accidentally returned to its closed stop position. The latching mechanism includes a stop plate mounted on the loader frame portion and a fully rotatable cam latch plate that is rotatably attached to the cab structure side wall. The latch plate automatically engages the stop plate when the cab structure is rotated to its fully forward stop position.

As the cab structure is rotated, the latch plate engages one end of the stop plate and is rotated slightly so tht it may slide across the top of the stop plate until the cab structure reaches its fully forward stop position. A notched portion of the latch plate then engages the opposite end of the stop plate for preventing movement by the cab structure back towards its closed stop position. The latch plate may be released or disengaged from the stop plate by the operator inserting his finger into an aperature in the latch plate and rotating the latch plate away from the stop plate. Thus, the latch plate prevents the cab structure from being accidentally returned to its closed position after it has been rotated to a full forward stop position.

Other advantages and meritorious features of the assist assembly of the present invention will be more fully understood from the following description of the invention, the appended claims, and the drawings, a brief description of which follows.

BRIEF DESCRIPTION OF DRAWINGS

FIG. 1 is a side elevational view of a front end loader including the assist assembly of the present invention.

FIG. 2 is a top plan view of the assist assembly and latching mechanism.

FIG. 3 is a partial side elevational view of the cab structure illustrating the assist assembly and latching mechanism.

FIG. 4 is an end view of the structure illustrated in FIG. 3.

DETAILED DESCRIPTION OF THE INVENTION

Figure 5:
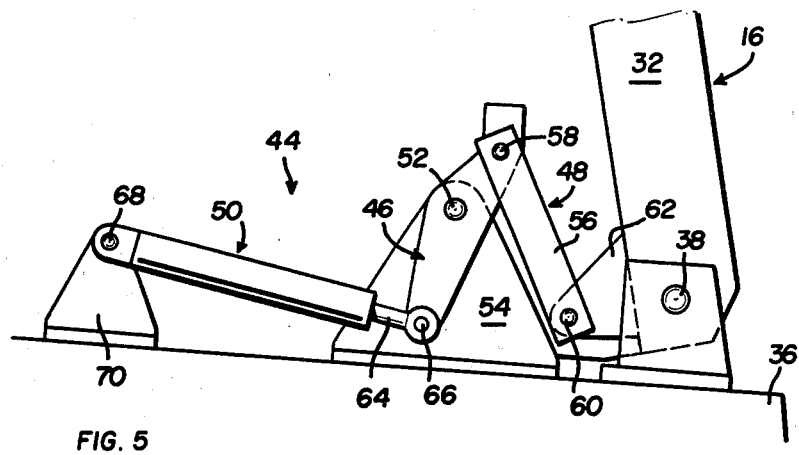
FIG. 5 is a side elevational view of the assist assembly when the cab structure is in its normally closed stop position.
Figure 9:
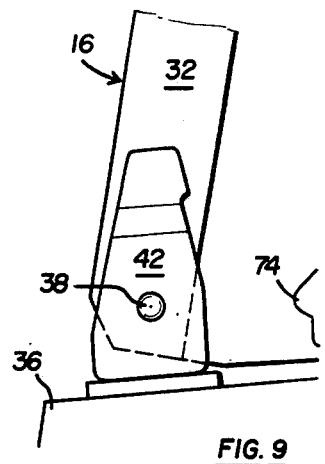
FIG. 9 is a side elevational view of the latching mechanism when the cab structure is in the position illustrated in FIG. 5.
Figure 6:
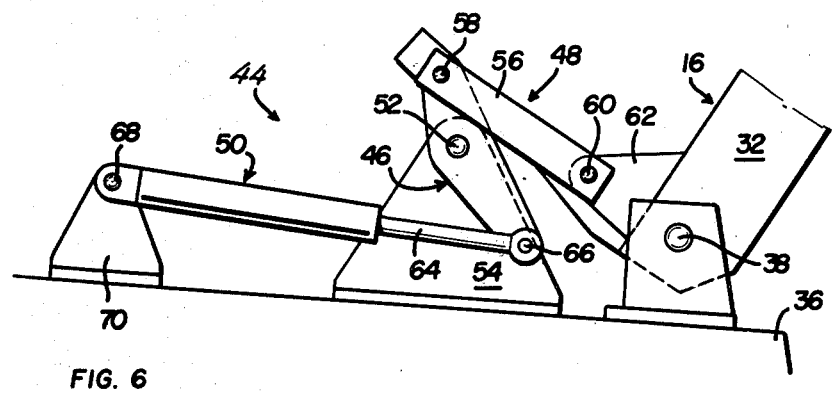
FIG. 6 is a side elevational view of the assist assembly when the center of gravity for the cab structure is directly above its rotational axis.
Figure 10:
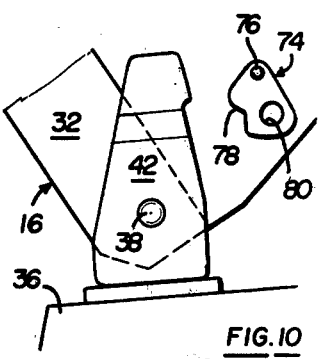
FIG. 10 is a side elevational view of the latching mechanism when the cab structure is in the position illustrated in FIG. 6.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings generally discloses a front end loader 10 consisting of an elongated body 12 having an engine compartment 14 and an operator's compartment including a cab structure 16 and seat 18, with the seat located within the cab structure between opposite sides of the elongated body 12.

Since the remaining elements to be described, with the exception of the assist assembly and latching mechanism, are duplicated on opposite sides of the main body 12, only one set of elements has been shown with the understanding that the description will likewise refer to an identical set of elements located on the opposite side of the main body.

A pair of transversely spaced stanchions or uprights 20 extend upwardly along opposite sides of the engine compartment 14 and terminate above the body 12 at a location spaced above the operator's seat 18. A lift arm 22 is pivotally connected at one end by a pivot pin 24 to the upper end of each of the uprights 20. The lift arms 22 are moved between lowered and raised positions by conventional fluid rams (not shown). The downwardly directed end portions of the lift arms are interconnected by a material handling implement 26, such as a bucket.

The cab structure 16 has the shape of an inverted open box consisting of front and rear sections 28, opposed side sections 30, and generally vertical corner columns 32, with the front, rear and side sections being interconnected by a top 34. As shown in FIGS. 1–4, cab structure 16 is rotatably attached to machine frame portion 36 by pivot pins 38 which pass through the lower ends of the forward corner columns 32. Each pivot pin 38 is supported between a lug 40 and a stop plate 42, which are secured to frame portion 36. Thus, cab structure 16 is rotatably movable about a horizontal axis that is transverse to the longitudinal axis of loader 10 between first and second stop positions shown in solid and phantom lines in FIG. 1.

In the solid line position or closed stop position as shown in FIG. 1, the longitudinal axis of cab structure 16 is substantially parallel to the longitudinal axis of loader 10 with the center of gravity of cab structure 16 being approximately located at point "A". Cab structure 16 may be rotated about the transverse horizontal pivot axis formed by pivot pins 38 to the phantom line or second stop position of FIG. 1 where the longitudinal axis of cab structure 16 is substantially perpendicular to the longitudinal axis of loader 10. The center of gravity "A" of cab structure 16 passes through a point directly above the rotational axis formed by pivot pins 38 during its rotational movement between the solid and phantom line positions.

Referring to FIG. 2, the assist assembly 44 of the present invention reduces the work required by an operator in moving the cab structure between its first and second stop positions shown in FIG. 1. The basic components of the assist assembly 44 include a bellcrank member 46, a cab movement transmission linkage 48, and an extensible and retractable actuator 50, which may be a gas spring actuator or its equivalent, such as a compression spring in a container. The bellcrank member 46 is rotatably mounted substantially at its mid portion by pin 52 to a vertical support lug 54 that is secured to machine frame portion 36. Cab movement transmission linkage 48 includes a pair of opposed parallel links 56 which are pivotally connected at one end to bellcrank member 46 by pin 58. The other end of links 56 is pivotally connected by pin 60 to bracket 62 which is secured to cab structure column 32. Piston rod 64 of actuator 50 is pivotally attached to bellcrank member 46 by pin 66. The opposite end of actuator 50 is pivotally attached by pin 68 to a vertical support lug 70 that is secured to machine frame portion 36.

The spatial relationship between the basic components making up the assist assembly 44 is illustrated in FIGS. 5–8. The piston rod is at all times biased or under pressure to move towards an extended position. Thus, actuator 50 applies a constant force on bellcrank member 46 that urges bellcrank member 46 to rotate in a first direction about pin 52. The pushing force from actuator 50 is converted by bellcrank member 46 into a constant pulling force on transmission linkage 48 at pin connection 58 which assists the operator in pivoting cab structure 16 until the center of gravity of cab structure 16 moves to a point directly above the rotational axis formed by pins 38. When the center of gravity for cab structure 16 moves past direct vertical alignment with the rotational axis formed by pins 38, the pulling force on linkage 48 from actuator 50 is opposed and counteracted by an even greater opposite pulling force from the cab structure at pin connection 60 which urges bellcrank member 46 to rotate in an opposite direction causing piston rod 64 to retract under pressure.

Thus, bellcrank member 46 reverses the direction of stroke of actuator 50 when the center of gravity for cab structure 16 moves in either direction beyond the point of direct vertical alignment with the rotational axis formed by pins 38. This assists the operator in rotating the weight of the cab structure 16 up to the point of vertical alignment and then dampens or retards the movement of the cab structure 16 until it reaches a stop position. The operation of the assist assembly 44 is the same for both movement by the cab structure 16 from its first stop position to its second stop position or movement by the cab structure from its second stop position to its first stop position.

The pin connection 60 for transmission linkage 48 is positioned radially outward from the horizontal axis formed by pins 38 and pin connection 58 is located on bellcrank member 46 at a point that is vertically spaced above actuator connection 66. With this arrangement, the rotational movement of bellcrank member 46 is reversed when the center of gravity for cab structure 16 passes through a point of direct vertical alignment above the horizontal axis formed by pins 38.

Figure 7:
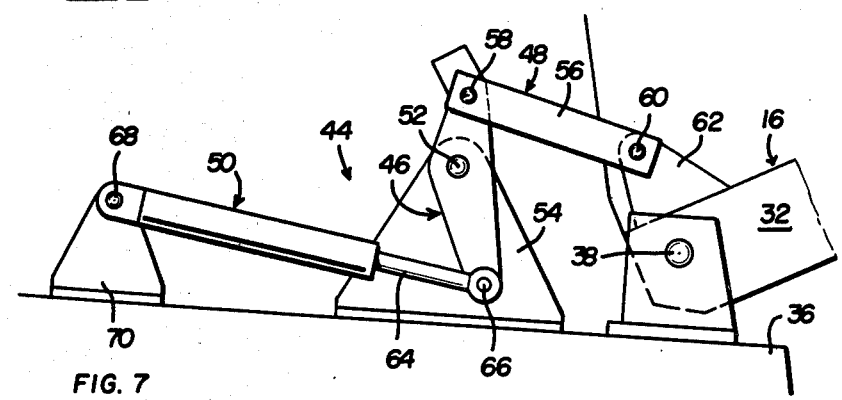
FIG. 7 is a side elevational view of the assist assembly after the bellcrank member has reversed the direction of stroke for the actuator.
Figure 11:
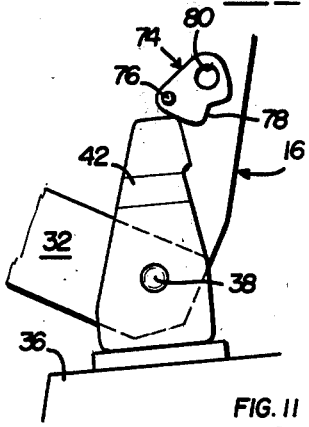
FIG. 11 is a side elevational view of the latching mechanism when the cab structure is in the position illustrated in FIG. 7.

FIG. 5 illustrates the assist assembly 44 when the cab structure 16 is in its normally closed or first stop position as illustrated by solid lines in FIG. 1. Piston rod 64 is biased outwardly thereby urging bellcrank member 46 to rotate about pin 52. This rotational force is converted by bellcrank member 46 into a pulling force on transmission linkage 48 which will assist the operator in rotating the weight of cab structure 66 towards the position illustrated in FIG. 6. When the cab structure 16 reaches the position shown in FIG. 6, its center of gravity is at a point directly above the horizontal axis formed by pivot pins 38. Further movement of cab structure 16 results in a pulling force on transmission linkage 48 at pin connection 60 which is opposite to and greater than the pulling force on linkage 48 from actuator 50. This reverses the rotational movement of bellcrank member 46 which causes piston rod 64 to retract under pressure as shown in FIG. 7. After the reversal of rotational movement by bellcrank member 46, actuator 50 continues to dampen or retard the movement of cab structure 16 until it reaches a full forward or second stop position as illustrated in FIG. 8 and the phantom line position of FIG. 1.

Figure 8:
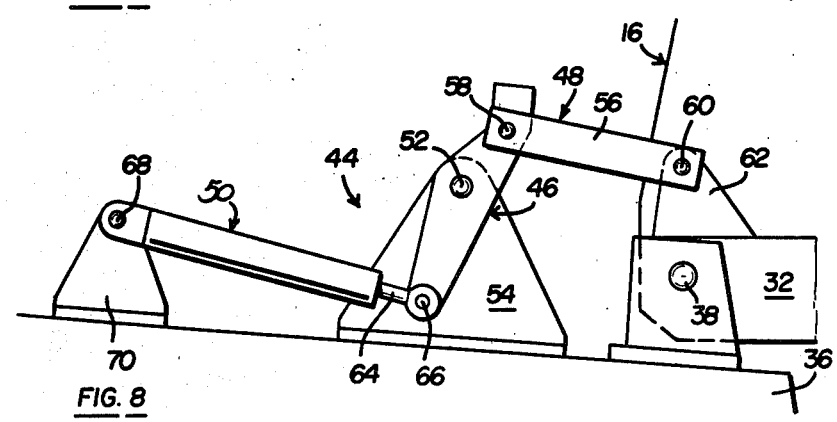
FIG. 8 is a side elevational view of the assist assembly when the cab structure is in its full forward stop position.
Figure 12:
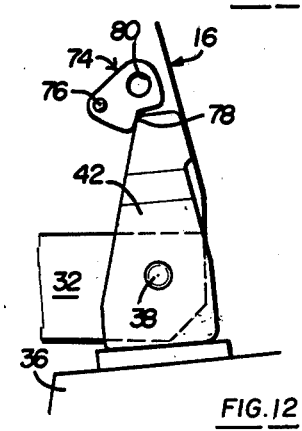
FIG. 12 is a side elevational view of the latching mechanism when the cab structure is in the position illustrated in FIG. 8.

The assist assembly 44 operates in the same manner, just described, when the cab structure 16 is rotated from the stop position shown in FIG. 8 to the stop position shown in FIG. 5. Thus, assembly 44 assists the operator in rotating the weight of the cab structure in either direction to the position shown in FIG. 6 and then dampens or retards the movement of the cab structure until it reaches a stop position as shown in either FIG. 5 or FIG. 8.

A releasable latching mechanism is provided for holding the cab structure 16 in the stop position shown in FIG. 8. This prevents the cab structure 16 from being accidentally returned to the position of FIG. 5. The latching mechanism includes stop plate 42 and a fully rotatable cam latch plate 74 that is rotatably attached to cab structure side wall 30 by pin 76. Latch plate 74 automatically engages stop plate 42 when cab structure 16 is rotated to a fully forward stop position as illustrated in FIG. 8 and the phantom line position in FIG. 1.

FIGS. 9-12 correspond to FIGS. 5-8 and they illustrate the various positions of the latch plate 74 as cab structure 16 is rotated to its full forward stop position. When cab structure 16 reaches the position of FIG. 7, cam latch plate 74 engages one end of stop plate 42 and is rotated slightly so that it may slide across the top of stop plate 42 until cab structure 16 reaches its fully forward stop position as shown in FIG. 8. The notched portion 78 of cam plate 74 then engages the opposite end of stop plate 42 for preventing movement by cab structure 16 back towards the position of FIG. 5. The latch plate 74 may be released or disengaged from stop plate 42 by the operator inserting his finger into latch plate aperture 80 and rotating latch plate 74 away from stop plate 42. Thus, latch plate 74 prevents cab structure 16 from being accidentally returned to the position of FIG. 5 after it has been rotated to the full forward stop position of FIG. 8.

It will be apparent to those skilled in the art that the foregoing disclosure is exemplary in nature rather than limiting, the invention being limited only by the appended claims.

I claim:

1. In a cab structure for an earth-working machine, said cab structure having the shape of an inverted open box with one edge thereof rotatably connected to a frame portion of said earth-working machine for permitting rotational movement of said cab structure about a horizontal axis that is transverse to the longitudinal axis of said machine, said cab structure being rotatable from a first stop position where its longitudinal axis is substantially parallel to the longitudinal axis of said machine to a second stop position where its longitudinal axis is substantially perpendicular to the longitudinal axis of said machine, the improvement comprising:

an assist assembly for reducing the work required by an operator in rotating said cab structure from its first stop position to its second stop position or from its second stop position to its first stop position, said assist assembly including a bellcrank member rotatably connected to a support means on said machine frame portion, a transmission linkage pivotally attached at one of its ends to an upper end of said bellcrank member and having its opposite end pivotally attached to said cab structure at a point radially outward from said horizontal axis, an extensible and retractable actuator constantly biased toward an extended position, said actuator pivotally connected at one end to a support means on said machine frame portion and having its opposite end pivotally connected to an opposite lower end of said bellcrank member;

the center of gravity for said cab structure moving through a point which is in direct vertical alignment with said horizontal axis when said cab structure is rotated from its first stop position to its second stop position or from its second stop position to its first stop position, said actuator applying a constant force on said bellcrank member that urges said bellcrank member to rotate in a first direction, the force from said actuator being transferred to said transmission linkage by said bellcrank member for providing mechanical assistance in rotating said cab structure until its center of gravity coincides with said point of vertical alignment with said horizontal axis, and said cab structure exerting a greater opposite force on said bellcrank member for rotating said bellcrank member in a direction opposite to said first direction when the center of gravity of said cab structure moves beyond said point of vertical alignment whereby said bellcrank member reverses the direction of stroke of said actuator and said actuator dampens or retards the rotational movement of said cab structure until it reaches a stop position.

2. The cab structure as defined in claim 1 including a latching mechanism for releasably holding said cab structure in its second stop position, said latching mechanism comprising a stop plate mounted on said machine frame portion and a cam latch plate rotably mounted to a side wall of said cab structure, said latch plate engaging said stop plate when said cab structure is rotated from its first stop position to its second stop position, said latch plate being rotated upon engagement with one end of said stop plate for permitting sliding movement by said latch plate across the top of said stop plate until said cab structure reaches its second stop position, and a surface on said latch plate engaging an opposed end of said stop plate when said cab structure has reached its second stop position thereby preventing further movement by said cab structure.

* * * * *